(No Model.)  2 Sheets—Sheet 1.
J. G. HOFFKEN.
MOWER.

No. 593,580. Patented Nov. 16, 1897.

Witnesses.
C. F. Kilgore
A. D. Merchant

Inventor
Jeremiah Gerhard Hoffken
By his Attorney.
Jas. F. Williamson (No Model.) 2 Sheets—Sheet 2.

J. G. HOFFKEN.
MOWER.

No. 593,580. Patented Nov. 16, 1897.

Witnesses.
C. F. Kilgore
P. D. Merchant

Inventor:
Jeremiah Gerhard Hoffken.
By his Attorney,
Jas. F. Williamson

THE NORRIS PETERS CO., PHOTO-LITHO., WASHINGTON, D. C.

UNITED STATES PATENT OFFICE.

JEREMIAH GERHARD HOFFKEN, OF GREEN ISLE, MINNESOTA.

MOWER.

SPECIFICATION forming part of Letters Patent No. 593,580, dated November 16, 1897.

Application filed February 8, 1897. Serial No. 622,564. (No model.)

*To all whom it may concern:*

Be it known that I, JEREMIAH GERHARD HOFFKEN, a citizen of the United States, residing at Green Isle, in the county of Sibley and State of Minnesota, have invented certain new and useful Improvements in Mowers, &c.; and I do hereby declare the following to be a full, clear, and exact description of the invention, such as will enable others skilled in the art to which it appertains to make and use the same.

My invention has for its object to provide certain improvements in mowing and similar machines with a view of simplifying their construction and at the same time increasing their efficiency and rendering the same more easily and safely manipulated.

To the ends above noted my invention consists of the novel devices and combinations of devices hereinafter described, and defined in the claims.

The preferred form of my invention is illustrated in the accompanying drawings, wherein, like characters indicating like parts throughout the several views—

Figure 1:
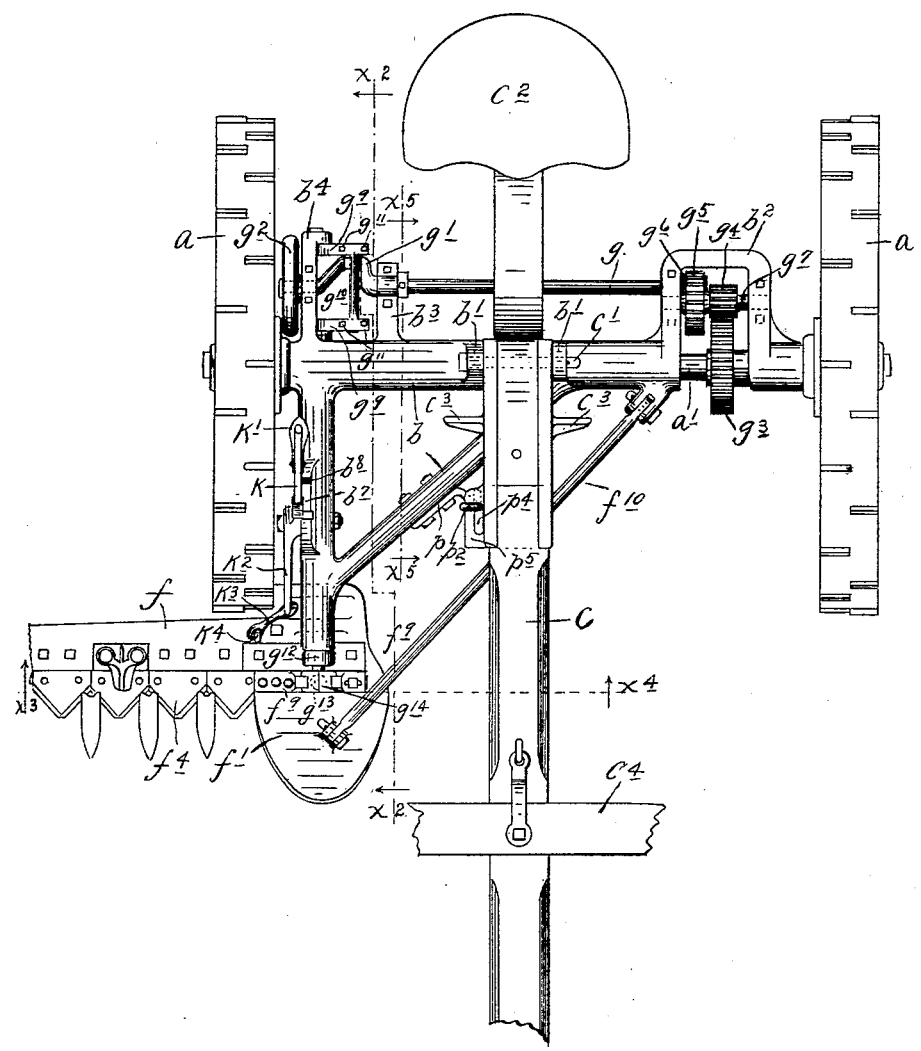
Figure 2:
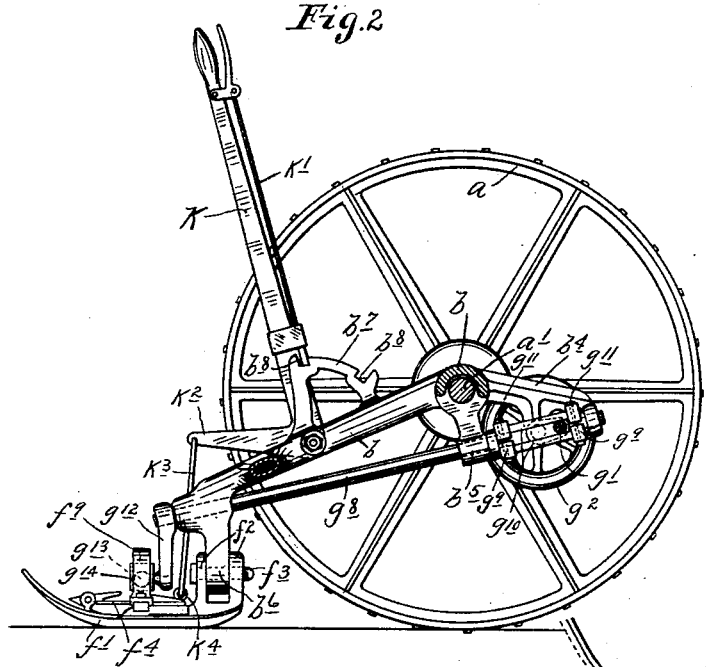
Figure 5:
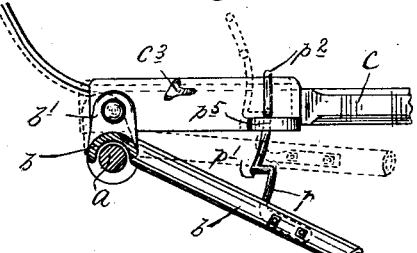
Figure 3:
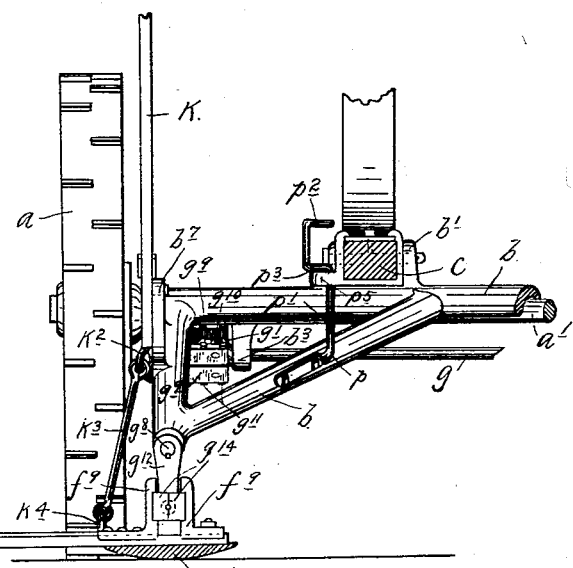
Figure 4:
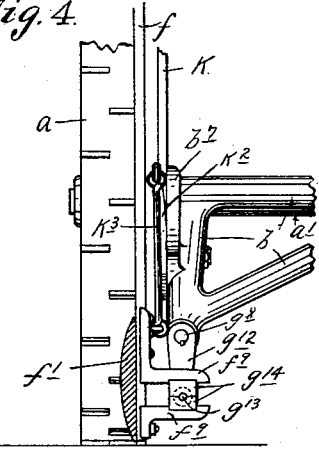

Figure 1 is a plan view of a mower constructed in accordance with my invention, some parts being broken away. Fig. 2 is a vertical section through the machine, taken on the irregular line $X^2 X^2$ of Fig. 1. Figs. 3 and 4 are transverse vertical sections taken on the line $X^3 X^4$ of Fig. 1, the former showing the finger-bar in its working position and the latter showing the same turned up or in an inoperative position, some parts of the mower being broken away; and Fig. 5 is a detail view in vertical section, taken on the line $X^5 X^5$ of Fig. 1, some parts being broken away.

$a$ indicates the traction-wheels of the mower, which are loose on the driving-axle $a'$, but are connected for movement therewith in one direction by means of the ordinary pawl-and-ratchet driving devices. (Not shown.) The mower-frame is in the form of a triangular-braced casting $b$, which is loosely journaled on the axle $a'$. On its upper central portion the frame-casting $b$ is provided with a pair of heavy lugs $b'$, between which the rear end of the pole $c$ is pivotally attached by means of a pivot-bolt $c'$. On the stubble side of the machine the frame-casting $b$ is cut away to expose a portion of the driving-axle $a'$ and is formed with a yoke portion $b^2$, which constitutes a gear nest or bracket for the multiplying-gears of the sickle drive or driving mechanism. On the grain side of the machine the frame-casting $b$ is provided with a pair of rearwardly-projecting supporting-brackets $b^3$ $b^4$ and with a depending bearing-arm $b^5$. Again, the said frame-casting $b$ is provided at the front end of its forwardly-projecting portion with a depending heavy hinge arm or lug $b^6$ and at its intermediate portion with a rigidly-secured lock-lever arch $b^7$, provided with notches $b^8$ at its extremities.

The finger-bar $f$ is secured to the shoe $f'$ in the customary way, and the said shoe is provided with a pair of heavy lugs $f^2$, adapted to embrace the depending frame lug or arm $b^6$ and to be pivoted thereto by means of a pin $f^3$ in such a manner that the finger-bar may be folded or turned into a vertical position by pivotal movement transverse of the machine, as is customary. The sickle or knife $f^4$ is mounted for reciprocating movement on the finger-bar $f$ in the customary way, but is provided with a sickle-head of novel construction. This sickle-head is formed by a pair of substantially L-shaped angle-irons $f^9$, the bases of which are secured to the sickle and the projecting portions of which are spaced apart from each other to form a crank-box seat, which is elongated approximately at right angles to the said sickle and finger-bar. As shown, a brace-bar $f^{10}$ is pivotally connected at one end to the body portion of the frame-casting $b$ and at its other end to the forward portion of the shoe $f'$.

The sickle-drive or sickle-driving mechanism will now be described, and it may be here premised that the principal novelty of my invention will be found in certain features of this driving mechanism, whereby the rotary motion of one shaft is caused to oscillate another shaft at approximately a right angle thereto, thus rendering it possible to reciprocate the sickle without the use of a pitman and in the connection between the oscillated or rocked shaft and the sickle, in virtue of which the finger-bar may be folded or turned up while the machine is running.

$g$ indicates a transverse crank-shaft which is loosely mounted in suitable bearings formed in the yoke or gear-nest $b^2$ and in the rearwardly-projecting arms or brackets $b^3$ $b^4$. The crank portion $g'$ of the crank-shaft $g$ is formed between the brackets $b^3$ and $b^4$, and just outward of the bracket $b^4$ the said shaft $g$ is provided with a small fly-wheel $g^2$. Under the advance movement of the machine a high rotary motion is imparted to the crank-shaft $g$ through a train of multiplying-gears involving a spur-wheel $g^3$ on the driving-axle $a'$, which is in mesh with the small member of a pair of spur-gears $g^4$ $g^5$, the large member $g^5$ of which is in mesh with a spur-pinion $g^6$ on the end of the said crank-shaft $g$. As shown, the pair of spur-gears $g^4$ $g^5$ are both rigidly secured on a short counter-shaft $g^7$, which is loosely mounted in suitable bearings secured on the yoke or gear-nest $b^2$.

A rock-shaft $g^8$ is loosely mounted longitudinally of the machine in suitable bearings formed in the forward portion of the longitudinal arm of the frame-casting $b$ and in the bearing-brackets $b^4$ $b^5$. Between its bearings in the brackets $b^4$ and $b^5$ the rock-shaft is offset or provided with a crank-head portion, preferably formed by crank-arms $g^9$ spaced apart, but parallel to each other and united at their free ends by a pair of bearing-rods $g^{10}$, that are spaced apart, so that they embrace the crank portion of the crank-shaft $g$ and run parallel to each other and nearly or exactly parallel to the said rock-shaft $g^8$. The arms $g^9$ are of such length relative to the stroke that under the rotary movement of the crank-shaft the said arms $g^9$ and rock-shaft $g^8$ will be oscillated through about forty-five or fifty degrees. In order to compensate for wear, I preferably split the free ends of the arms $g^9$ between the rods $g^{10}$ and pass bolts $g^{11}$ through these pronged ends. By means of these bolts $g^{11}$ the rods $g^{10}$ may of course be properly alined and adjusted to and from each other.

On its forwardly-projecting end the rock-shaft $g^8$ is provided with a downturned rocker or sickle-driving arm $g^{12}$, which in turn is provided at its free end with a bearing-ball $g^{13}$. A sectioned or two-part bearing-box $g^{14}$ embraces the bearing-ball $g^{13}$ and works with freedom for sliding movement within the seat formed between the sickle-head sections $f^9$. The sides of the box-sections $g^{14}$ are grooved to fit the bearing portions of the sections $f^9$, so as to hold said box-sections in working position, while permitting the same to move in the manner indicated, but hereinafter more fully described.

To the radial center of the lever-arch $b^7$ is pivoted a lifting-lever $k$, provided with a hand-operated latch $k'$, which coöperates with the notches $b^8$ to rigidly secure said lever in either of two different positions on the said arch $b^7$. The lifting-lever $k$ is provided with a bell-crank extension $k^2$, the free end of which is connected by means of a link $k^3$ to an eye or hook $k^4$, secured on the finger-bar $f$ some little distance outward from the vertical line through the point of its pivotal attachment to the frame-lug $b^6$. It may be here noted that the axial center of the pivot-pin $f^3$, which pivotally connects the finger-bar to the said frame lug $b^6$, is on a line with the center of the bearing-ball $g^{13}$ of the sickle-driving arm $g^{12}$ when said arm $g^{12}$ is turned straight downward. Hence it of course follows that the position of the sickle blades or sections will not be changed in respect to the fingers of the finger-bar when the said finger-bar is turned from one position to another, while the arm $g^{12}$ stands vertical.

To the inclined or braced portion of the frame-casting $b$ is secured a latch spring or lock $p$, which, as shown, is in the form of a spring-rod provided with a latch-shoulder $p'$ at its intermediate portion and terminating at its extreme upper end in a foot-piece $p^2$, and provided just below this foot-piece with a stop-shoulder $p^3$. This latch-spring $p$ works through a slot $p^4$ of a casting or lock-piece $p^5$, secured to the side of the pole $c$. This latch-spring $p$ in coöperation with the lock-plate $p^5$ is adapted to work as follows: When the mower-frame $b$ is raised to its extreme uppermost position, the latch-shoulder $p'$ will be automatically engaged with the upper face of the lock-plate $p^5$ and will hold the frame locked to the pole. By placing the foot on the foot-piece $p^2$ the latch-shoulder $p'$ may be released from the lock-plate $p^5$ and the mower-frame $p$ may be permitted to lower into its operative position or into a position to render the cutting mechanism operative. An extreme downward movement of the frame is, however, limited by the engagement of the stop-shoulder $p^3$ with the lock-plate $p^5$.

The tongue $c$ carries the seat $c^2$, the foot-rest $c^3$, and the doubletree or draft appliance $c^4$.

The operation of the machine as an entirety, briefly summarized, is substantially as follows: When the machine is drawn, the sickle will of course be reciprocated in a manner already indicated. When the finger-bar is thrown into its horizontal position, the sickle will be given its full or maximum stroke. When the outer end of the finger-bar is raised, or, in other words, when the finger-bar is turned toward its folded position, the stroke of the sickle will become shorter and shorter until the said finger-bar reaches its folded position, (indicated in Fig. 4,) in which position the stroke of the sickle will be extremely small, but throughout these changes in the position of the finger-bar the stroke of the rock-shaft and sickle-driving arm $g^{12}$ are not interfered with. Obviously in the folded position of the finger-bar (indicated in Fig. 4) the bearing-box $g^{14}$ will be reciprocated lengthwise of the seat formed between the sickle-head sections $f^9$. The driver sitting on the seat $c^2$ with his feet on the foot piece or rest $c^3$ finds a base of resistance on the pole, and with his hand on the lever $k$ may manipulate the same as follows: If it is desired simply to fold or partially fold the finger-bar so as to cut on an incline or to trim a hedge, it is only necessary to release the latch $k'$ from the forward notch $b^8$ and then draw the free end of the lever $k$ rearward. If, however, it is desired both to raise the frame and fold the cutter-bar, the free end of the lever $k$ should first be drawn rearward without releasing its latch from the forward notch $b^8$, thus raising the forward end of the frame-casting $b$, carrying with it the finger-bar $f$ and locking said frame $b$ to the pole in a manner fully described. Then after the frame and finger-bar have thus been raised the finger-bar may be folded on the frame by releasing the lever-latch from the forward notch $b^8$ and moving the same into engagement with the rear notch $b^8$. In this position said parts are locked and held when out of use.

The fly-wheel $g^2$ of course serves to render the action of the driving mechanism steady and free from impulses. By extending the guide or seat for the box $g^{14}$, formed between the sections of the sickle-head $f^9$, at an incline from the face of the finger-bar instead of at a right angle, as shown, the amount of movement which the sickle will be given when the finger-bar is folded may be increased.

It will of course be understood that various alterations in the specific details of construction above set forth may be made without departing from the spirit of my invention.

What I claim, and desire to secure by Letters Patent of the United States, is as follows:

1. In a harvesting-machine, the combination with the sickle, of a drive for the same involving, a rotary crank-shaft, and a rock-shaft arranged approximately at a right angle thereto and provided with a crank-head with longitudinally-extended bearing-surface, subject to the action of the crank portion of said crank-shaft, substantially as described.

2. In a harvesting-machine, the combination with the sickle, of a drive for the same involving, a rotary crank-shaft, and a rock-shaft arranged approximately at a right angle thereto and provided with a crank-head with longitudinal parallel bearing-bars, between which the crank portion of said crank-shaft works, substantially as described.

3. In a harvesting-machine, the combination with the sickle, of a drive for the same involving, a rotary crank-shaft, a rock-shaft arranged approximately at a right angle thereto and provided with a crank-head with longitudinally-extended and laterally-adjustable parallel bearing-bars, between which the crank portion of said crank-shaft works, substantially as described.

4. In a harvesting-machine, the combination with the sickle, of a drive for the same, involving the crank-shaft $g$ $g'$ with fly-wheel $g^2$, and the rock-shaft $g^8$ with crank-arms $g^9$, split at their free ends and provided with the parallel longitudinally-extended bearing-rods $g^{10}$, embracing the crank portion $g'$ of said crank-shaft $g$ $g'$ and adjustable by means of the bolts $g^{11}$, substantially as described.

5. In a harvesting-machine, the combination with the sickle, provided with a head formed by projecting parallel sections, of a sickle-drive involving, a rotary crank-shaft, a rock-shaft arranged approximately at a right angle to said crank-shaft and provided with a crank-head with longitudinal parallel bearing-bars, between which the crank portion of said crank-shaft works, and a crank-arm on said rock-shaft, provided, at its free end, with a bearing-box which works between the parallel sections of said sickle-head, substantially as described.

6. In a harvesting-machine, the combination with a frame or frame-section, pivoted on the truck-axle, of a pole pivotally secured to said frame, in close proximity to the axle-center, a support for the rider carried by said pole, a finger-bar pivoted to said frame, and a lifting-lever pivoted on said frame, rigidly securable thereto, at will, and connected to said finger-bar, whereby the rider may use said lever, at will, either to fold said finger-bar on said frame, or to raise said frame, together with said finger-bar, substantially as described.

7. In a harvesting-machine, the combination with a frame or frame-section, pivoted on the truck-axle, of a pole pivotally secured to said frame, in close proximity to the axle-center, a support for the rider carried by said pole, a finger-bar pivoted to said frame, a lifting-lever pivoted to said frame, rigidly securable thereto and connected to said finger-bar, and a foot-released spring latch or lock for temporarily locking said frame to said pole, when said frame is raised, substantially as described.

In testimony whereof I affix my signature in presence of two witnesses.

J. GERHARD HOFFKEN.

Witnesses:
R. B. READY,
PETER CORNICA.